United States Patent [19]
Farina et al.

[11] Patent Number: 5,856,880
[45] Date of Patent: *Jan. 5, 1999

[54] LASER ASSISTED THERMO-ELECTRIC POLING OF FERROELECTRIC MATERIAL

[75] Inventors: James D. Farina, Tolland; Donald E. Bossi, South Windsor; Robert A. Rubino, Jr., Tolland, all of Conn.

[73] Assignee: Uniphase Telecommunications Products, Inc., Bloomfield, Conn.

[ * ] Notice: The terminal 9 months of this patent has been disclaimed.

[21] Appl. No.: 226,441

[22] Filed: Apr. 12, 1994

Related U.S. Application Data

[63] Continuation of Ser. No. 716,493, Jun. 17, 1991, abandoned.

[51] Int. Cl.⁶ .................................................... G02F 1/13
[52] U.S. Cl. ............................................. 359/43; 359/45
[58] Field of Search ............................ 264/24; 156/600, 156/603, 664; 29/25.35; 385/28, 121, 131; 359/326, 43, 45; 365/121

[56] References Cited

U.S. PATENT DOCUMENTS

| | | | |
|---|---|---|---|
| 3,997,687 | 12/1976 | Phillips | 427/12 |
| 4,056,304 | 11/1977 | Phillips | 427/162 |
| 4,109,359 | 8/1978 | Cross et al. | 29/25.35 |
| 4,611,260 | 9/1986 | Bauer | 361/233 |
| 4,731,754 | 3/1988 | Ogden et al. | 365/121 |
| 5,036,220 | 7/1991 | Byer et al. | 359/326 |
| 5,082,349 | 1/1992 | Cordova-Plaza et al. | 385/28 |
| 5,106,211 | 4/1992 | Chiang et al. | 385/132 |
| 5,171,400 | 12/1992 | Magel et al. | 756/603 |
| 5,205,904 | 4/1993 | Yamamoto et al. | 156/664 |

*Primary Examiner*—William L. Sikes
*Assistant Examiner*—James A. Dudek
*Attorney, Agent, or Firm*—McCormick, Pauldi & Huber LLP

[57] ABSTRACT

A ferroelectric material 44 is selectively poled using laser light 14 capable of being absorbed by the material 44, a shutter 18 for turning the light on and off, a variable attenuator 28, with a beam splitter 31 and an optical detector 31a, to set the laser power level, a lens 32 to provide focused laser light 14d, a mirror 36 driven by a motor 40 (mirror-scanner) to direct the light to the regions to be poled, and an electric field applied by electrodes 68, 70. A computer 24 provides automatic control over selective poling of the material 44 by controlling the shutter 18, variable attenuator 28, mirror 36 position, and the direction of the applied electric field. A temperature sensor 52 provides temperature feedback to ensure proper laser power and dwell time. In the alternative, the material 44 is covered with a mask 604 and scanned with the laser to provide selective pole reversal.

12 Claims, 10 Drawing Sheets

FIG. 10d ously to selectively
LASER ASSISTED THERMO-ELECTRIC POLING OF FERROELECTRIC MATERIAL This application is a continuation of Ser. No. 07/716,493 now abandoned.

TECHNICAL FIELD

This invention relates to crystallographic alignment (poling) of a material and more particularly to selectively poling a material using a laser and an electric field.

BACKGROUND ART

It is known in the art that the crystal orientation of ferroelectric materials such as lithium niobate ($LiNbO_3$) or lithium tantalate ($LiTaO_3$) exhibit an inherent polarization which describes the atomic orientation (or ferroelectric polarization axes) of the material structure. It is also known that the polarization dictates the sign of nonlinear effects of the material and when it is aligned in a certain way, the material is useful for performing functions such as optical frequency doubling of incident light (e.g., converting infrared light having a wavelength of 0.8 $\mu$m to blue light having a wavelength of 0.4 $\mu$m), or for surface acoustic wave generation.

As used herein, the terms "poling" and "poled" refer to the act of orienting the ferroelectric polarization axes of the material, or the process by which the orientation of these axes is changed. Also, unless otherwise specified, the term "polarization" refers to the aforementioned ferroelectric material characteristic.

In one optical application, i.e., optical frequency doubling, a light wave is launched into one end of a ferroelectric material which has a polarization aligned perpendicular to the travelling wave and regions of the material are poled in alternating directions. A layer of the material along its surface provides a waveguide for the light to travel within (e.g., 10 $\mu$m thick). The changes in direction of polarization of the material creates an alternating pattern (also called spatially alternating periodic ferroelectric domains).

Three known fabrication processes for providing a polarization pattern on a material are: titanium indiffusion (Ti in-diffusion), dilithium oxide ($Li_2O$) out-diffusion, and electron beam bombardment. The Ti in-diffusion process comprises first applying titanium to the +z surface of the material (i.e., the +z-axis being normal to the surface being poled) and then heating the material by convection (i.e., in an oven) to a temperature of 950° to 1100° C. for $LiNbO_3$. Heating the material causes the titanium to "in-diffuse" into the surface, thereby permanently reversing the polarization direction in the titanium in-diffused regions.

The $Li_2O$ out-diffusion process comprises first applying an evaporation protective coating or mask with holes to the +z surface of the $LiNbO_3$ and then heating the material to 1000° C. in a dry inert atmosphere (e.g., argon (Ar)). $Li_2O$ evaporates out of the material in the regions uncovered by the coating thereby reversing the polarization in that region.

The electron beam bombardment method comprises first attaching thin, e.g., 500 Angstroms (Å) Nicrome (i.e., NiCr or Nickel Chromium) electrodes (i.e., one that passes electrons freely) on opposite ends of the material, e.g., top and bottom for a z-cut material, between which the polarization is desired, then placing a thin (approximately 4000 Å) mask of gold on top of the top electrode, the mask having holes where polarization reversal is desired. The mask does not pass the electron beam (i.e., it absorbs electrons), thereby blocking the region of the material covered by the mask from exposure to the beam. Next, a voltage is applied across the electrodes such that an electric field of approximately 10 v/cm exists therebetween. While the electric field is applied, an electron beam is applied to the material in a vacuum. This beam creates a "transient vacancy" in the crystalline structure and allows the lithium atoms to move, thereby forcing the crystal to be poled in the direction of the applied electric field.

The aforementioned techniques provide selective poling along the surface of the material which does not extend uniformly from one side of the waveguide, along the z-axis, to the other (i.e., does not provide a "rectangular" grating) and thus they do not provide maximum performance efficiency for functions such as optical frequency doubling. Furthermore, these techniques must all be performed on pre-poled material, i.e., a material that has a predefined direction of polarization all pointing in the same direction. Thus, they provide alternating poled regions by merely reversing the existing polarization in certain areas and leaving other areas alone, thereby creating the desired bidirectional poling pattern having a controlled "period" between changes in direction. Moreover, these techniques are currently performed only on z-cut material, i.e., a material whose polarization axis (z-axis) is normal to the surface to be poled.

If selective poling of localized regions on non z-cut material were available, that obviated the aforementioned shortcomings, it would not only improve the efficiency of optical functions such as optical frequency doubling, but would also open up a whole new realm of possible applications yet to be discovered.

It is known that a bulk sample of non z-cut material may be poled using convection heating and an electric field. This technique comprises, first attaching electrodes to opposite ends of the material between which polarization is desired, then heating the material (e.g., in an oven) to a temperature above the Curie temperature (1150° C. for $LiNbO_3$ and 610° C. for $LiTaO_3$) which, as is known, unpolarizes the material (i.e., exhibits random orientation of the polarization axes) and allows the polarization to be set by the presence of an electric field. A voltage is applied across the electrodes thereby creating an electric field therebetween, and, while the electric field is applied, the temperature of the material is reduced below the Curie temperature which fixes the polarization in the direction of the electric field, i.e., the polarization in the material remains after the electric field is removed. Although this process may be used with either pre-poled or unpolarized material, an entire sample of material (i.e., bulk samples such as in boule form) must be poled all in the same direction. Thus, this process cannot be used to provide the aforementioned selective spatially alternating pattern which is desired for many applications.

DISCLOSURE OF THE INVENTION

Objects of the invention include selectively poling ferroelectric materials that may or may not be pre-poled, which provides improved performance of existing optical applications, and which permits the fabrication of devices previously unattainable.

According to a first aspect of the present invention, a ferroelectric material is selectively poled by first heating a surface of the material, or a specific localized region thereof, near the Curie temperature and below the melting temperature of the material using a light beam, such as a laser, while applying an electric field to the heated region having a component along the desired polarization direction, and then allowing the material to cool with the electric field in place. This procedure may be repeated with the laser directed to another region on the surface of the material to be poled, until the material has the desired polarization pattern. According further to the invention the material may be non z-cut material.

According to a second aspect of the invention, a ferroelectric material, which is uniformly pre-poled in one direction, is selectively re-poled by first applying a mask to the surface of the material on regions where polarization reversal is not desired, then scanning the laser across the surface of the material in the presence of a constant electric field (which is not in the same direction as the preexisting polarization); as the laser scans across the sample, the temperature of the regions not covered by the mask are heated near the Curie temperature and below the melting temperature and are re-poled in the direction of a component of the applied electric field. The polarization direction of the regions beneath the mask remains unaffected.

The present invention provides, for the first time, selective poling of a ferroelectric material using a light beam. The invention may use material which has a z-axis that is not perpendicular to the plane of the surface that the laser light is incident upon (i.e., non z-cut material). The invention also provides selective poling of one or more localized regions of the material (i.e., precise selection of which regions and in which direction the poling shall be performed). Furthermore, the invention provides poling which extends more uniformly across the poled region (which may be used as a waveguide) than poling provided by existing techniques. Selective poling of non z-cut material allows the development and manufacture of many applications never before possible using z-cut material selectively poled by existing techniques, and allows some functions, normally performed on z-cut material, to be performed more efficiently. The invention may also be used on z-cut material provided certain techniques are used for generating the electric field perpendicular to the surface.

The foregoing and other objects, features, and advantages of the present invention will become more apparent in the light of the following detailed description of exemplary embodiments thereof, as illustrated in the accompanying drawings.

BRIEF DESCRIPTION OF THE DRAWINGS

FIG. 10 is a timing and position diagram showing:

(a) the laser beam position plotted against time;

(b) shutter window position plotted against time and distance along the material;

(c) localized substrate surface temperature along the material plotted against time and distance along the material; and (d) applied electrode voltage plotted against time.

BEST MODE FOR CARRYING OUT THE INVENTION

Figure 1:
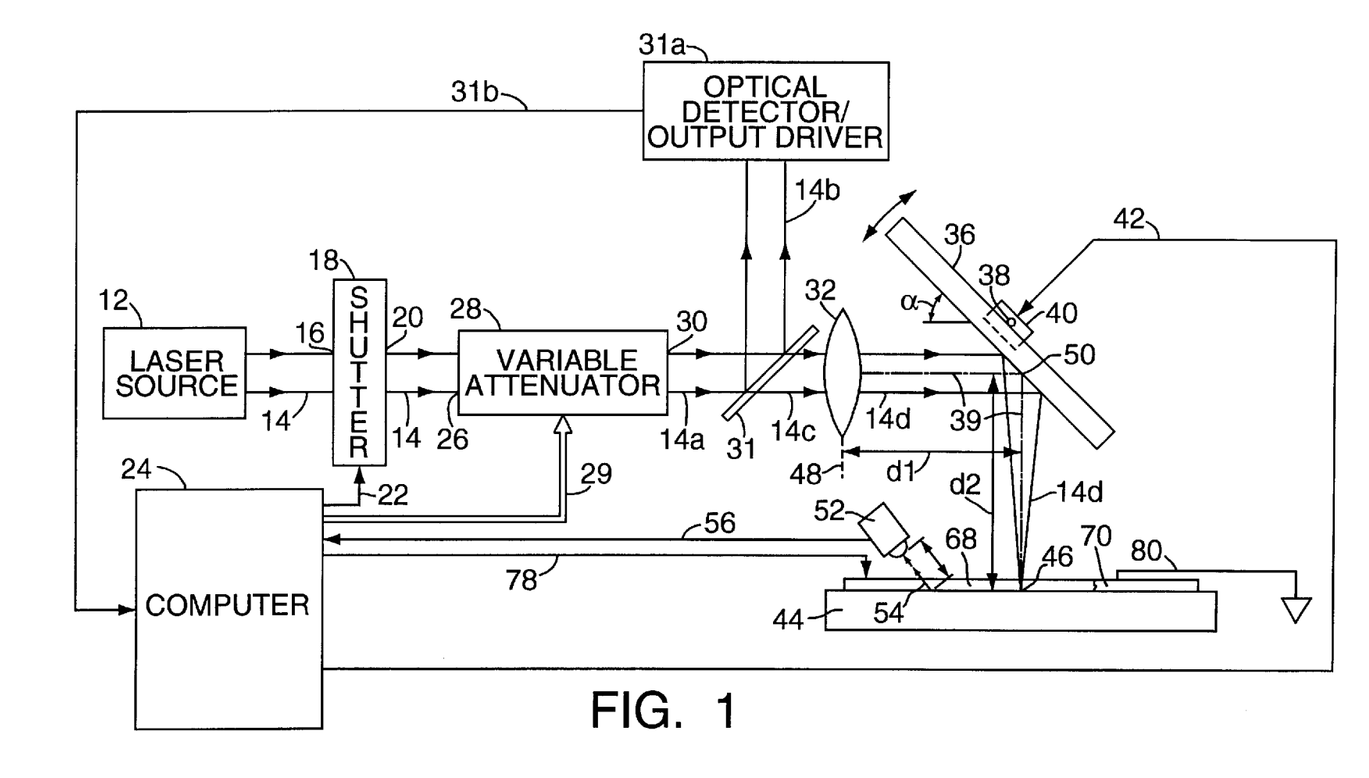
FIG. 1 is a schematic diagram of a laser driven thermo-electric poling system of the present invention.

Referring to FIG. 1, a laser driven thermo-electric poling system includes a laser light source 12, such as a Line Lite Laser Corp., 5 watt optical fixed power $CO_2$ (carbon dioxide) gas laser, Model No. 945, that provides a collimated beam of laser light 14 with a wavelength of 10.6 $\mu$m (i.e. 10.6 microns or $10.6 \times 10^{-6}$ meters) and a diameter of 5 millimeters. Laser light 14 from the laser 12 is transmitted through free space to an input port 16 of a known optical shutter assembly 18 such as a Uniblitz Model No. SD-1000. The shutter assembly 18 contains known components such as a mechanical shutter window which controls the passage of light from the input port 16 to an output port 20 in a manner similar to the shutter on a camera. The shutter window position is responsive to a discrete electrical input signal on a line 22 from a computer 24. Applying 5 volts to the shutter assembly 18 fully opens the shutter window thereby allowing all the laser light to pass through the window to the output port 20. Conversely, applying 0 volts to the shutter assembly 18 fully closes the shutter window thereby blocking all laser light from passing through the window.

When the shutter is open, laser light 14 from the port 20 of the shutter assembly 18 is passed through free space to a port 26 of a known variable optical attenuator 28, such as a II–VI Inc. Model No. PAZ-6-AC housed in a Newport Corp. Model 496 motorized rotary mount. The attenuator 28 provides a variable reduced intensity laser light beam 14a, of the same cross-sectional area as the incoming beam 14, in response to voltage signals on lines 29, from an output port 30. The attenuator 28 acts on the incoming light beam 14, as is known, by passing it through two successive optical analyzers (also known as an optical polarizer/analyzer pair), each passing only the incident light having a component along its output (or transmission) axis. The first analyzer has a fixed output axis aligned with the optical polarization of the laser light, thereby allowing maximum transmission of the laser light. The first analyzer also provides light optically polarized in a known direction to the second analyzer. The second analyzer has a variable output axis, responsive to the position of a stepper motor which is responsive to analog voltage signals on the lines 29 from the computer 24. The relative angle between the axes of the first and second analyzer determines the amount of output intensity. When the two analyzer output axes are aligned with each other, maximum output transmission (intensity) occurs. Conversely, when the axes are not aligned, the output intensity is reduced (attenuated) by an amount proportional to the angle between them, and when they are 90° apart, minimum (zero) transmission occurs. Alternatively, the attenuator may be manually operated and comprise a plurality of tinted windows with various degrees of tint, disposed on a circular wheel, which absorb the laser light power. The reduced intensity laser beam 14a is passed through free space to a known beam splitter 31, e.g., a II–IV Inc. Model No. 0405-0500-UC, 0.5 inch diameter zinc selenide (ZnSe) beam splitter, which reflects a known portion of the power (e.g., 18%) of the incident beam 14a to create a reflected beam 14b and passes the remainder (e.g., 82%) of the power of the incident beam 14a to create an output (passed) beam 14c. Beam splitters with other passing/reflecting ratios may be used if desired. The reflected beam 14b is passed through free space to an optical detector/output-driver 31a, e.g., a Scientech Inc. Model No. 36001 detector connected to a Model No. 372 driver, which provides an electrical output voltage signal on a line 31b ranging from 0 to 100 millivolts to the computer 24, proportional to the power of the incoming beam 14b (the driver also provides a visual meter readout). The detector must be able to accept the diameter and wavelength of the laser beam 14b incident upon it. The computer may alternatively read the optical detection signal directly from an optical detector without an output driver. The passed beam 14c is passed through free space to a known positive meniscus lens 32 composed of a material, e.g., zinc selenide (ZnSe), that is transparent (i.e., passes light without reflecting or absorbing it) to the laser wavelength and has a fixed focal length, e.g., 60 millimeters (or 6 centimeters (cm)). The lens 32 converts a collimated laser light beam 14c to a focused beam 14d which is focused to a minimum cross-sectional area, e.g., 10 $\mu$m, at a distance equal to the focal length from the lens. Lenses with other focal lengths may be used if desired.

Figure 2:
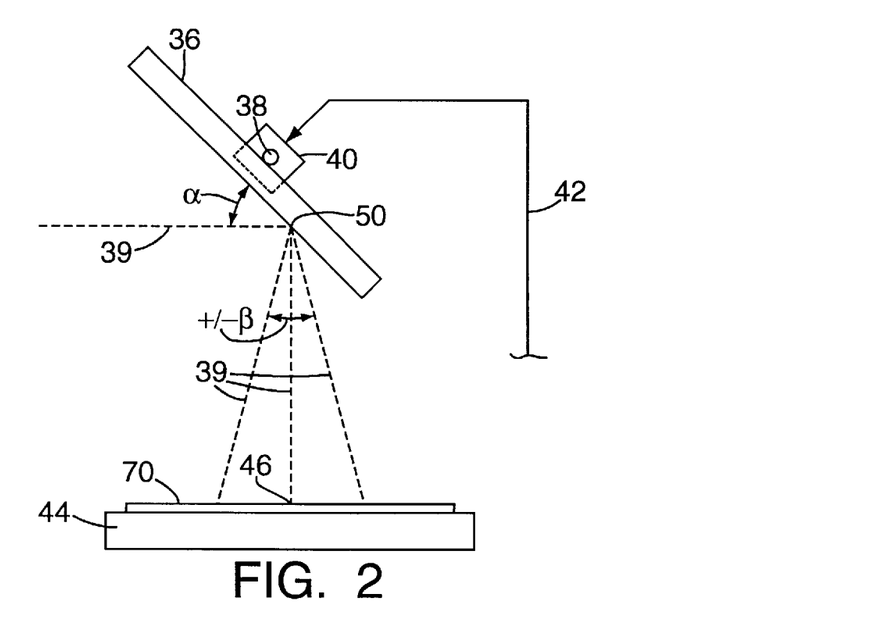
FIG. 2 is a blown up view of the mirror-scanner, the center of the laser beam, and the material to be poled shown in FIG. 1.
Figure 3:
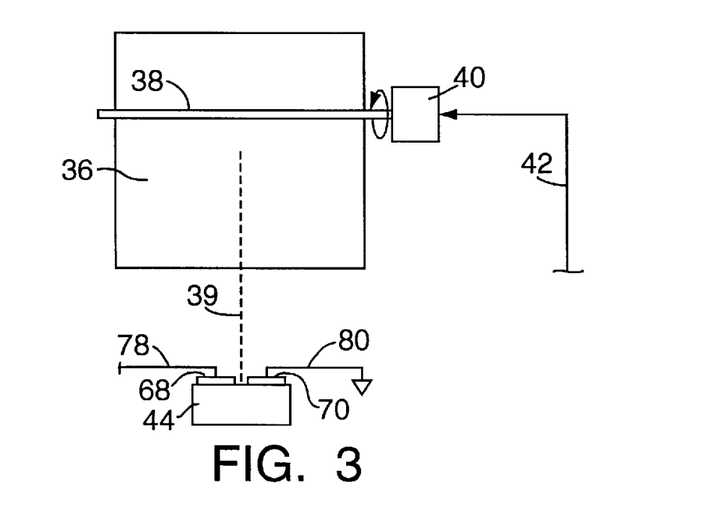
FIG. 3 is a side elevation view of the mirror-scanner, the center of the laser beam, and the material to be poled shown in FIG. 1.

Laser light from the lens 32 is passed through free space to a known mirror-scanner comprising a mirror 36, having a reflective surface with typical dimensions of 4 cm long by 4 cm wide, composed of gold evaporated on silicon or any material which provides approximately 100% reflection of the incident light beam, disposed on an shaft 38 driven by a motor 40, e.g., General Scanning Inc. Gavanometer Scanner and Driver, Model No. AX-200, which controls the position of the mirror 36 in response to an electrical signal on a line 42 from the computer 24. The mirror 36 is mounted at an angle $\alpha$ relative to the horizontal and rotated about the shaft 38 to direct the center 39 of the focused laser beam 14d from the lens 32, through free space, through an angle $\pm\beta$ (FIG. 2) relative to the vertical (i.e., normal to the surface of the material) thereby scanning the focused beam 14d along the material 44 to be poled (FIG. 2). The angle $\beta$ traced by the center 39 of the focused beam 14d is proportional to the voltage applied on the line 42, i.e., +1.75 to −1.75 volts corresponds to beam angles ($\beta$) of +5.7° to −5.7° respectively, and is set such that an angle ($\beta$) of 0° corresponds to a laser position where the center 39 of the laser light strikes approximately the mid-point 46 along the length of the material 44 to be poled. Other orientations of the mirror that scan the laser along the surface of the material, other voltage ranges, and other voltage-to-angle relationships, may be used if desired.

The centerline 48 of the lens 32 is placed a known distance d1 from the point 50 where the center 39 of the focused laser beam 14d strikes the mirror 36, e.g., 1 cm, leaving the remainder of the focal length, e.g., 5 cm, as the distance d2 from the point 50 where the center 39 of the laser beam 14d strikes the mirror 36 to the surface of the material 44. Other distances d1,d2 from the mirror-scanner to the lens 32 and to the material 44 may be used if desired.

A temperature sensor 52, such as an Ircon Inc. Modline Series 6000 Radiation Thermometer Model No. 6-15C5-0-0-1-00-0-000 with Model P-3 Objective Lens Assembly (5 inch circular sensing head), capable of measuring the temperature of a precise region (e.g., 88 $\mu$m) of the material surface, is mounted near one end of the material 44 (or any location that is not in the path of the laser). The sensor, as is known, focuses on a circular region of the surface and senses infrared thermal radiation 54 emitted from the surface of the material when the material is heated and provides an analog voltage signal on a line 56 to the computer 24 ranging from 0 to 100 millivolts proportional to the surface temperature. The sensor is mounted a distance d3, e.g., approximately 4 inches, from the surface of the material but may be mounted up to 7 inches from the surface to allow temperature measurement of various heating diameters on the material, e.g., 7 inches corresponds to 1.5 mm focusing diameter. Different distances and focusing diameters may be used if desired by choosing different objective lens assemblies.

As described hereinbefore, it is known that materials such as lithium niobate ($LiNbO_3$) or lithium tantalate ($LiTaO_3$) exhibit a polarization which describes the atomic orientation (or ferroelectric domains) of the structure. It is also known that when the temperature of a ferroelectric material such as $LiNbO_3$ or $LiTaO_3$ is raised above the Curie temperature of the material, the atomic crystalline structure changes and the material looses its ferroelectric polarization thus becoming unpolarized. Further, it is known that when an electric field is applied to a ferroelectric material that is heated above the Curie temperature, the atoms within the crystalline structure will align themselves in the direction of the applied electric field. Also, it is known that a material may be heated by absorbing laser radiation (photons) which excite the atoms in the material thereby raising the temperature thereof.

We have found that a laser with the appropriate wavelength and power can be used to heat a localized area of the surface of the material above the Curie temperature, and that the laser-heated material exhibits substantially the same properties as when heated using convection heating, e.g., in an oven. We have also found (by examining the cooled material with a microscope) that laser heating causes no structural damage to the crystal, provided the temperature does not exceed the melting temperature of the material (which is above the Curie temperature for $LiNbO_3$ and $LiTaO_3$). Furthermore, the material in the unheated regions (adjacent to the heated regions) is unaffected by this heating.

The invention uses the focused laser beam 14d to heat a region of the material 44 above the Curie temperature thereby removing any preexisting polarization in that region, applies an electric field to the material 44 thereby poling the material 44 in the heated region, and turns off or moves the focused laser beam 14d allowing the region to cool below the Curie temperature while the electric field is applied thereby permanently poling that region in the direction of the electric field.

Figures 4, 5, 11:
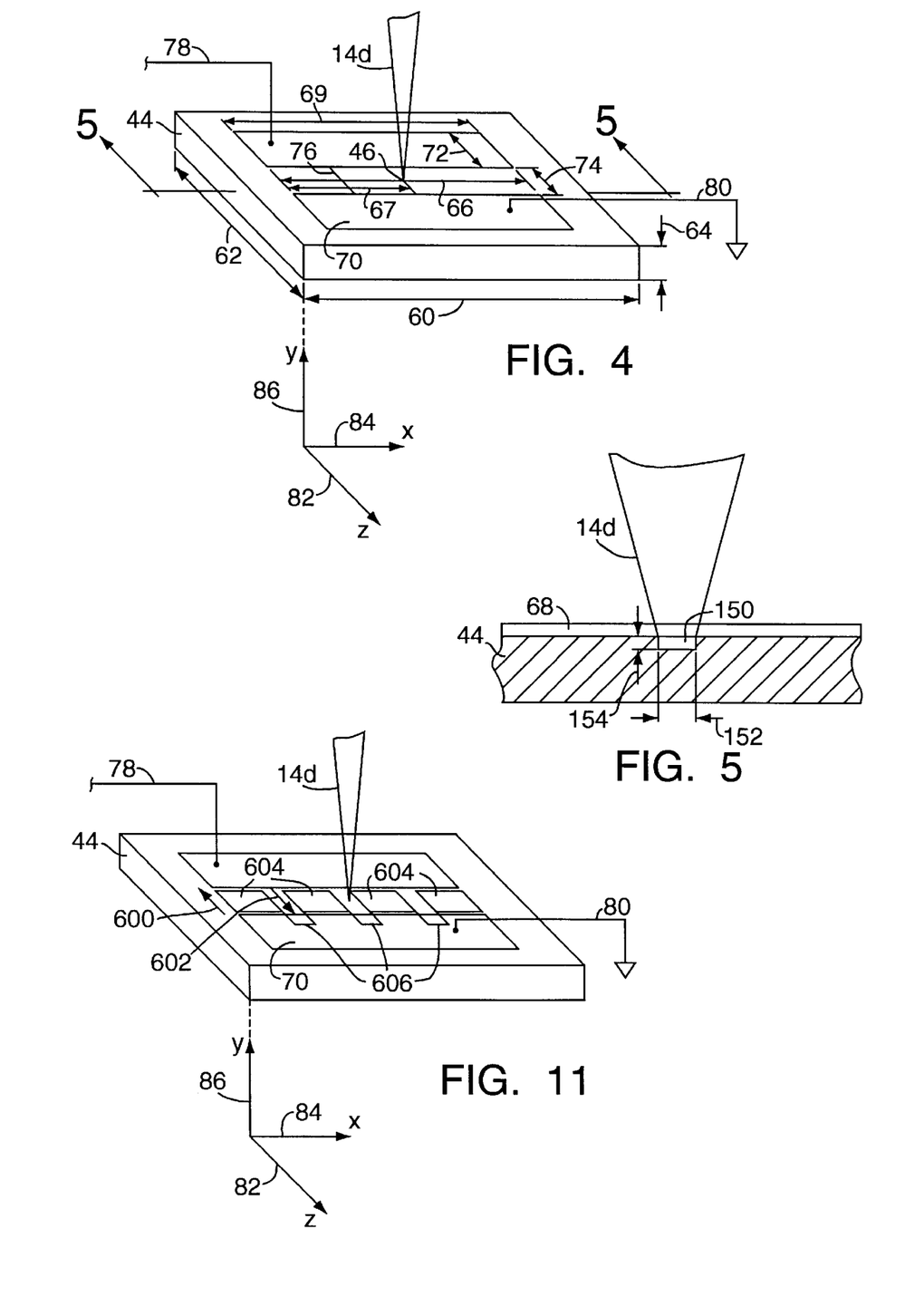
FIG. 4 is a perspective view of the material to be poled and an associated coordinate system, in accordance with the first aspect of the invention.
FIG. 5 is a broken away sectioned side elevation view of the material taken on the line 5—5 in FIG. 4 showing a region poled with the laser beam.
FIG. 11 is a perspective view of the material to be poled and an associated coordinate system, in accordance with a second aspect of the invention.

Referring now to FIGS. 1 and 4, the material 44 absorbs radiation from the incident laser beam 14d. The light produced by the laser 12 must have a wavelength that can be absorbed by the material 44 to be poled (e.g., 10.6 $\mu$m for $LiNbO_3$ or $LiTaO_3$), and the optical power output of the laser 12 must be sufficient to generate enough heat in the material to raise the upper surface temperature above the Curie temperature of the material. Typically the amount of power required to be absorbed by the surface of the material to heat the surface above the Curie temperature in the region to be poled is 200 to 500 milliwatts. The ferroelectric material to be poled (typically LiNbO$_3$ or LiTaO$_3$) has the dimensions 60,62,64 of 3 inches long, 2 inches wide, 1 millimeter thick, respectively. The distance 66 along the material 44 to be poled is typically 1 cm long. Other dimensions and shapes of material, and other poling lengths along the material may be used if desired.

It is known that the localized intensity of a laser beam varies along the cross section of the beam and is equal to power per cross-sectional area. The highest intensity occurs at the center of the beam and changes nonlinearly in a known way (as a gaussian or normal distribution, i.e., a bell curve) from the center, radially outward to the fringe of the beam. However, the beam has a constant cross-sectional power at any point along the path of the beam. Thus, by focusing the beam to some minimum area, the full laser power exists in that area and will transfer the most radiation intensity there. Therefore, the distance d2 from the mirror 36 to the material 44 is set to focus the minimum beam area on the surface of the material in the location to be poled. When the angle β (Fig.2) is 0°, the beam is at the point 46 along the material, and the cross-sectional area of the beam incident on the surface is the smallest. As the beam position (β) changes, the distance from the mirror to the point being poled increases slightly thereby increasing the beam cross section incident on the surface. If the distance d2 is large relative to the distance 67 traveled by the beam (half the total distance poled), the change in beam cross-sectional area at the point of contact on the surface is minimal. Furthermore, the distance d2 is not critical if the intensity at each point of the beam incident on the material surface desired to be poled is greater than that required to reach the Curie temperature. Still further, if the area to be poled is larger than the minimum area of the focused beam, the material may be placed a distance from the lens closer to or farther away from the focal length of the lens, provided the power in the cross-sectional area of the beam incident on the surface is high enough to heat the area to be poled above the Curie temperature.

Two electrodes 68,70 composed of a known conductive material, such as chrome-gold comprising 100 Angstroms (Å) thick of chrome and 10,000 Å thick of gold (the typical range of gold thickness is 5,000 to 50,000 Å), are attached to the surface of the material 44 by "evaporating" each layer on the surface (i.e., first spattering chrome in liquid droplet form on the surface of the substrate to form a continuous layer and then spattering gold in liquid droplet form on the surface of the chrome to form a continuous layer). The electrodes 68,70 have typical dimensions 66,72 of 1 cm long and 1 millimeter wide, and are typically placed a distance 74 of 10 to 50 μm apart. The length 66 of the electrodes 68,70 must be at least as long as the distance along the material to be poled. Other dimensions of, and spacing between, the electrodes may be used if desired.

The area to be poled is heated above the Curie temperature (1150° C. for LiNbO$_3$ and 610° C. for LiTaO$_3$) but below the melting temperature (1253° C. for LiNbO$_3$ and 1650° C. for LiTaO$_3$) in the presence of an applied electric field (which may be in either one of two directions indicated by lines 76). The electric field 76 is created in the material 44 by applying an analog voltage signal on a line 78 to one electrode 68 from the computer 24, and connecting the other electrode 70 to ground potential by a line 80. The material 44 may have a pre-existing polarization or may be unpolarized (i.e., random polarization orientation) before being poled (or re-poled) by the invention.

Referring now to FIG. 5, this process provides poling of an area 150 on the upper surface of the material 44 equal to the cross-sectional area of the focused beam 14d where the localized intensity is high enough to heat the surface above the Curie temperature. The diameter 152 of the beam is chosen based on the desired size of the poled regions and typically ranges from 10 μm to 4 mm but may be larger by providing adequate laser power or smaller by using a lens that provides a smaller focal area (minimum focusing spot). The depth 154 of the poling is approximately 7 μm.

The material 44 will likely be cut, such that the z-axis 82 (i.e., the polarization axis) of the material 44 is parallel to the direction of the electric field 76, as shown in FIG. 4 (i.e., "y-cut" material). The "cut" of the material indicates the axis perpendicular to the surface being poled. The electric field acts like a force vector to orient the +z-axis of the material in the desired direction (i.e., flip the +z-axis). Thus, the applied electric field must have a component in the z-axis direction for the z-axis to be flipped. Thus, for the electrode and laser configuration of FIG. 4, the z-axis may be in any direction other than perpendicular to the surface of the material that the laser is incident upon (i.e., non z-cut material). However, the initial orientation of the electric field (relative to the z-axis) will determine the required strength thereof. The invention may also be used for poling z-cut material, as described hereinafter.

Figure 6:
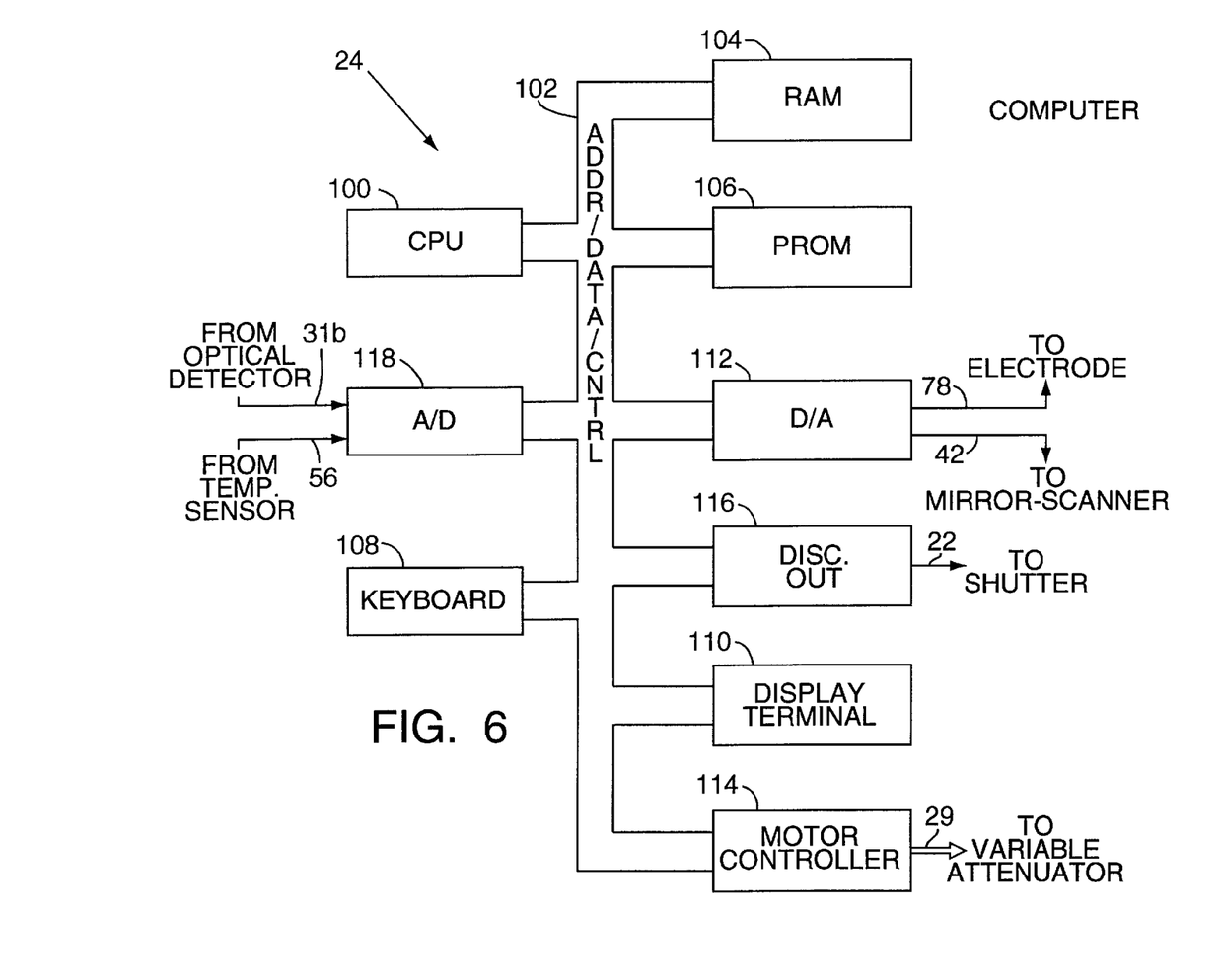
FIG. 6 is a schematic block diagram of the computer shown in FIG. 1.

Referring now to FIG. 6, the computer 24 (FIG. 1) contains known digital and analog electronic components such as a central processing unit (CPU) 100, e.g., a microprocessor, having a plurality of address, data, and control lines 102 connected to volatile 104 and non-volatile 106 memory and capable of accepting inputs from a keyboard 108 and driving an output display terminal 110. The computer 24 also comprises a digital to analog converter 112 (D/A) output interface capable of providing a first analog voltage output signal on the line 78 to the electrode 68 ranging from −10 to +10 volts and a second analog output voltage signal on the line 42 to the mirror-scanner, ranging from +1.75 to −1.75 volts, both in response to a proportional command of digital bits from the CPU 100. The computer 24 also contains a motor controller output interface 114 (e.g., a plug-in I/O card and power module Newport Corp. Model PMC 300) which provides analog output signals on the lines 29, that drive the stepper motor inside the variable attenuator 28 of FIG. 1, in response to a proportional command of digital bits from the CPU 100. A discrete output interface 110 provides a discrete voltage output signal of 0 or 5 volts (TTL type) on the line 22 in response to a proportional command of digital bits from the CPU 100. The CPU 100 is capable of accepting analog inputs from an analog to digital converter (A/D) 118 analog input interface which receives a first analog voltage signal ranging from 0 to 100 millivolts on the line 31b from the optical detector/output-driver 31a (FIG. 1) and a second analog signal ranging from 0 to 100 millivolts on a line 56 from the temperature sensor 52 (FIG. 1) and selectively converts the input voltages to a series of bits indicative thereof that are readable, upon request, by the CPU. A computer such as an IBM P/S-2 comprising a keyboard, display monitor, suitable memory storage, and motherboard plug-in analog output, discrete output, and analog input cards may be used to perform this function.

To provide spatially selective poling over an area smaller than that capable of being sensed by the temperature sensor, e.g., less than 88 μm in diameter, the material may be manually calibrated to determine the precise power level and dwell time required of the incident laser beam 14 to achieve the radiation level to exceed the Curie temperature but to not reach the melting temperature. Each material will have a unique set of power and time values. However, once a given material such as $LiNbO_3$ or $LiTaO_3$ has been calibrated, the characteristics of the material are typically repeatable enough to not require recalibration for different samples of the same material and may be stored in nonvolatile memory of the computer, provided substantially the same ambient temperature is used each time.

Manual calibration of the power level and dwell time is performed, as is known, by trial and error. First, the shutter is opened and the material is heated using the laser set at the lowest power and at the desired dwell time (e.g., 1 second) while applying an electric field along the +z-axis. Second, the shutter is closed and the crystal is allowed to cool below the Curie temperature. Third, the electric field (voltage polarity) is reversed, and the laser is moved to the next spot to be poled. The first, second, and third steps are repeated enough times to provide a representative number of samples (e.g. 10 times) along the material. The material is then physically cut (sliced) along a plane perpendicular to the upper surface as shown in FIG. 5. Next, the cutaway cross section of the material is polished to a smooth surface. Then, a chemical etch, e.g., one part hydrofluoric acid (HF) and two parts nitric acid ($HNO_3$), is applied to the polished surface. The chemical etch attacks the regions poled in the +z-axis direction and does not attack regions poled in the −z-axis direction. After the etch has been applied for approximately one hour, the material is placed under a microscope and the cross-sectional area is examined. If regions exhibit alternating patterns which are eroded (e.g., by approximately 10 $\mu$m) and not eroded, the material has been successfully poled, and the power and dwell times are recorded. If the material cross section does not exhibit this characteristic, the incident laser power is increased and the above procedure is repeated.

Figures 7, 7A:
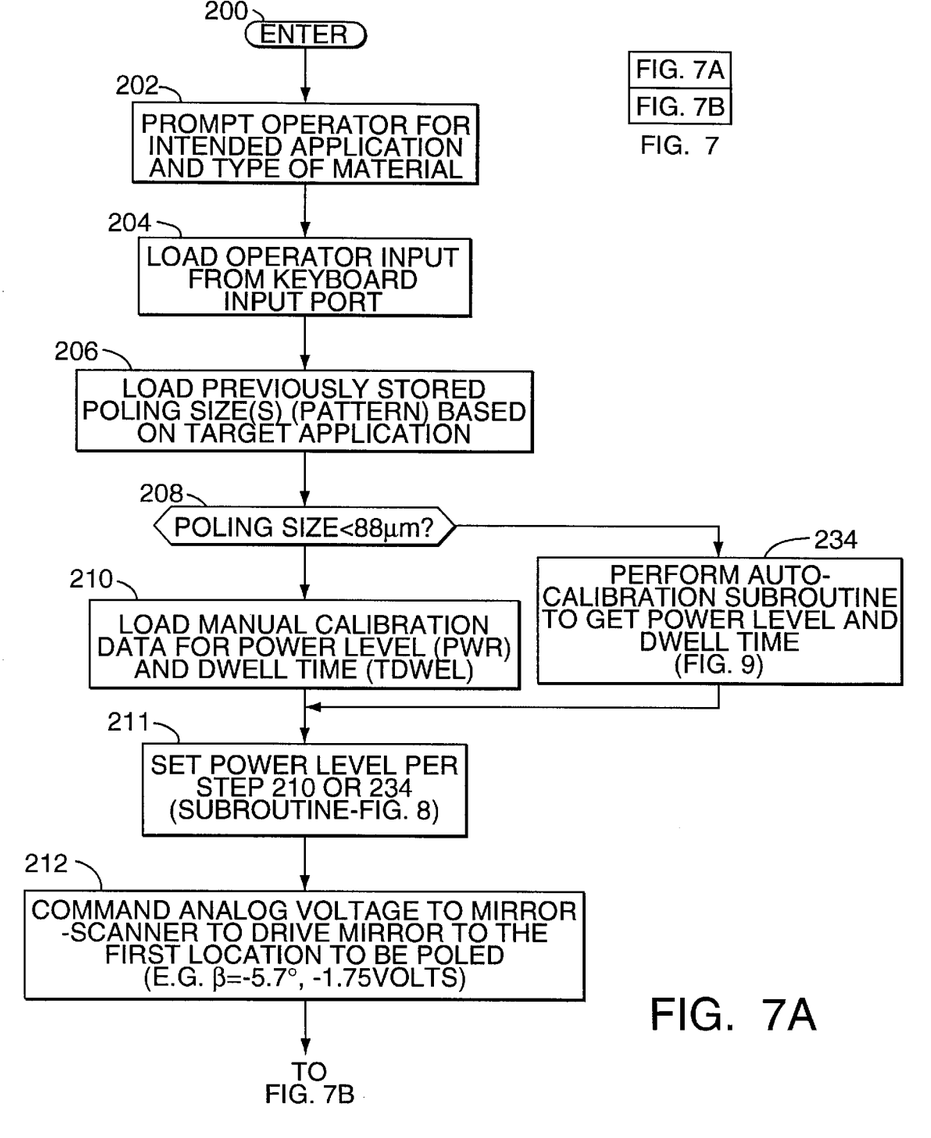
FIG. 7 is a flow chart of the main poling program to be executed by the computer of FIG. 3.
Figure 7B:
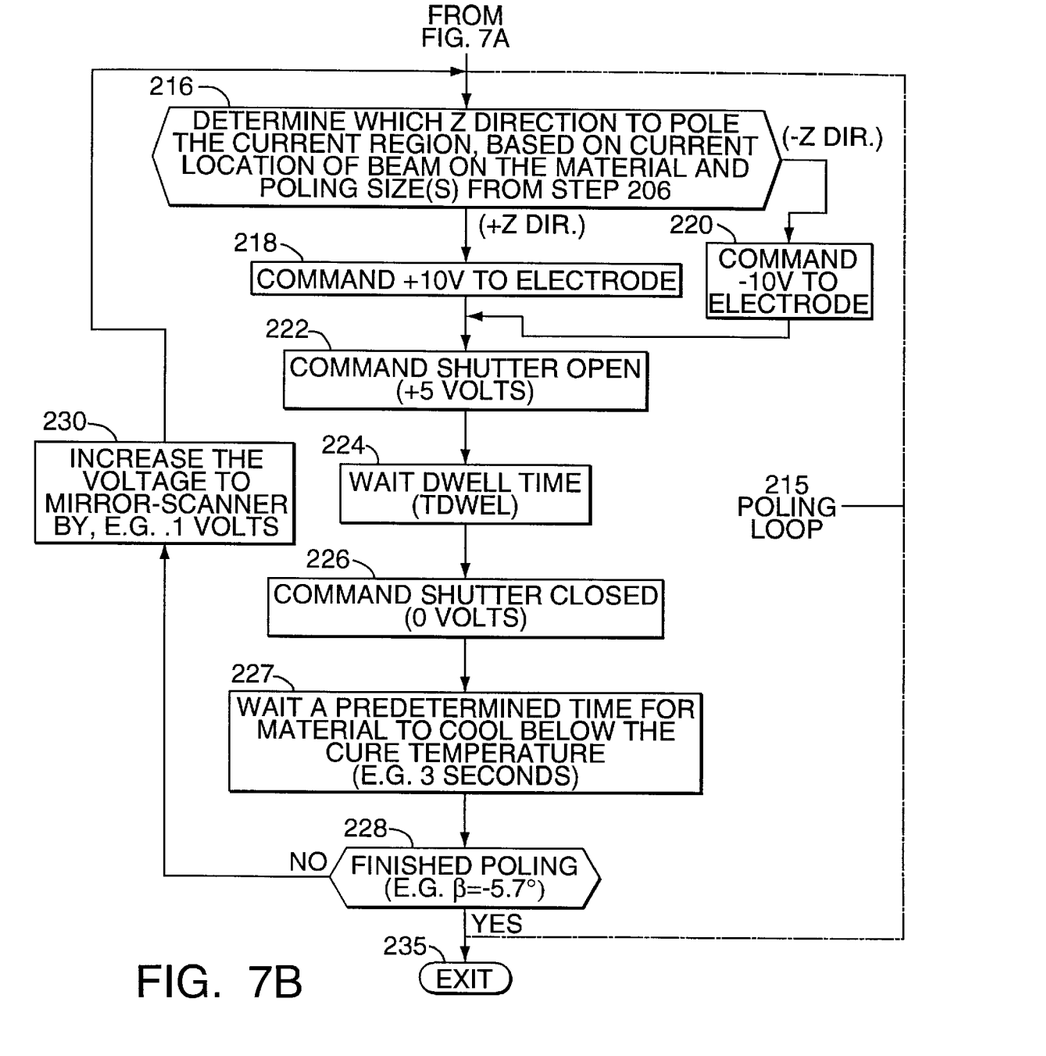

Referring now to FIG. 7, when poling of a material is desired, an operator initiates a software routine executed by the computer 24 (FIG. 1) which begins at an entry point 200, and a first step 202 prompts the operator to input the type of material to be poled and the intended use (application) for the poled material 44 will be used for. The polarization pattern is dependant upon (and unique for) each type of application, e.g., a uniform alternating pattern of 9 $\mu$m between successive polarization directions is required for third order optical frequency doubling of red light (i.e., converting red light to blue light). Then a step 204 reads the operator inputs from the keyboard 108. The operator inputs may also be retrieved by the computer without operator intervention from a prestored file in the nonvolatile memory 106. Then a step 206 loads the prestored data which provides the size(s) of each region to be poled (i.e., poling the pattern). This may be simply one number, for an application which alternates the material polarization at equal intervals for the entire length of the substrate, or many numbers, for an application which has a nonuniform polarization pattern. Then a test 208 determines if the size of the regions to be poled for a given application requires auto-calibration or manual calibration to obtain the appropriate power level and dwell time. If the size is too small for the temperature sensor to detect, e.g., 88 $\mu$m, manual calibration is required, and a step 210 retrieves the power level and dwell time acquired from the aforementioned manual calibration procedure for this material. Then a step 211 causes execution to jump to a set power level subroutine shown in FIG. 8 which commands the motor controller to drive the stepper motor in the variable attenuator 28 (FIG. 1) to the required power setting (as described hereinafter).

After the power level is set, a step 212 positions the mirror 36 to direct the laser 14 to the first location along the material 44 to be poled (e.g., $\beta = -5.7°$) by commanding an appropriate analog voltage signal (e.g., −1.75 v) to the digital to analog converter output interface on the line 42 (FIG.1) to the mirror-scanner. Then, the software enters a poling loop 215 where a test 216 determines which direction the current region should be poled (and thus which direction to apply the electric field) based on the current location of the beam on the material and poling size(s) determined in step 206. If test 216 determines the direction to be poled is in the negative z-axis direction, then a step 218 commands an analog voltage of +10 v on the line 78 to the electrode 68 (FIG. 1). Otherwise, the current location will be poled in the positive z-axis direction, and a step 220 commands an analog voltage signal of −10 v on the line 78 to the electrode 68 (FIG. 1). Orientation of the +10 v and −10 v with the +z-axis and −z-axis respectively, may be reversed if desired. After commanding an electrode voltage of ±10 volts, a step 222 commands a voltage of 5 v to the discrete output interface which provides a signal on the line 22 to open the shutter 18 (FIG. 1). Then a step 224 engages a wait loop for a dwell time (TDEWL), e.g., 1 second for $LiNbO_3$ and for $LiTaO_3$, predetermined from the aforementioned calibration data in either step 210 or 234. When the wait loop expires, a step 226 commands a voltage of 0 volts to the discrete output interface 110 (FIG. 4) of the computer 24 on the line 22 to close the shutter 18 (FIG. 1). Then a step 227 waits a predetermined time known to be long enough to cool the surface below the Curie temperature with the maximum ambient temperature, e.g., 3 seconds. Then a test 228 determines if the angle $\beta$ is at the desired point to stop poling (e.g.,+5.7°). If the test 228 determines that poling is not complete, a step 230 will command the position of the mirror 36 to direct the laser 14 to the next location along the material 44 to be poled (the required change in $\beta$ degrees depends on the application) by commanding an appropriate analog voltage signal to the digital to analog converter output interface on the line 42 to the mirror-scanner, e.g., increase the voltage by 0.1 volts. Execution then loops back to the test 216 where poling of the next region is performed within the poling loop 215. If the test 228 determines that poling is complete, the main program is exited from the exit point 234 and program execution stops.

Instead of waiting the predetermined dwell time in step 224, the poling loop may alternatively monitor the surface temperature at step 224 and wait, in a loop, for the temperature to reach the Curie temperature (or for a worst case maximum time to elapse). Then the logic may proceed to step 226.

Figure 8:
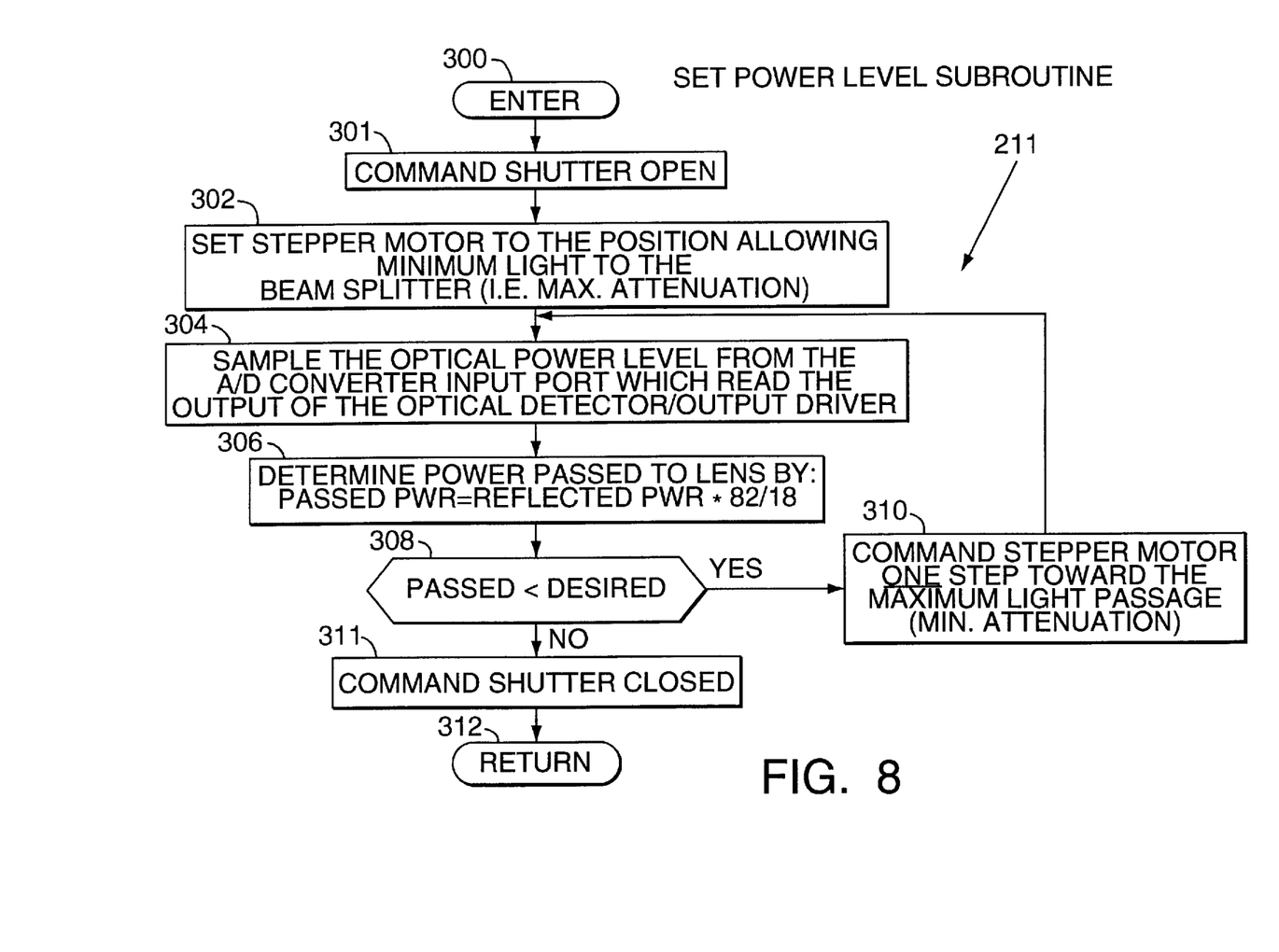
FIG. 8 is a flow chart of a set power level subroutine used in FIG. 7.

Referring to FIG. 8, the set power level subroutine 211 begins at entry point 300, and a step 301 commands the shutter to the open position to allow the light power to be measured. Then a step 302 commands the motor controller to drive the stepper motor to position the attenuator to allow the minimum amount of light to the output (i.e., maximum attenuation). Then a step 304 commands the A/D to sample the optical power from the input port which reads the output signal on the line 31b from the optical detector/output driver 31a (FIG. 1). Then a step 306 calculates the laser power passed to the lens (passed beam 14c) by the beam splitter 31 using the equation:

$$\text{Passed Power} = \text{Reflected Power} * 82/18 \qquad (eq.1)$$

where reflected power is the power read from the A/D converter, and the ratio 82/18 is the ratio of passed to reflected laser power by the beam splitter. Then a test 308 compares the passed power against the desired output power to the material. If the passed power is less than the desired power, a step 310 commands the motor controller to move the stepper motor one step toward the maximum light passage, i.e., minimum attenuation. If the passed power is greater than or equal to the desired power, a step 311 commands the shutter to the closed position and program execution returns to the routine that called it through a point 312.

Instead of starting the set power level subroutine 211 by driving the stepper motor to the minimum light setting, the logic may alternatively drive the stepper motor in the direction of the desired power by not performing step 302 and modifying step 310 to command the stepper motor one step toward the desired power and modify test 308 to test the power level to be within a threshold level. Other logic may be used to set the power if desired.

Figure 9:
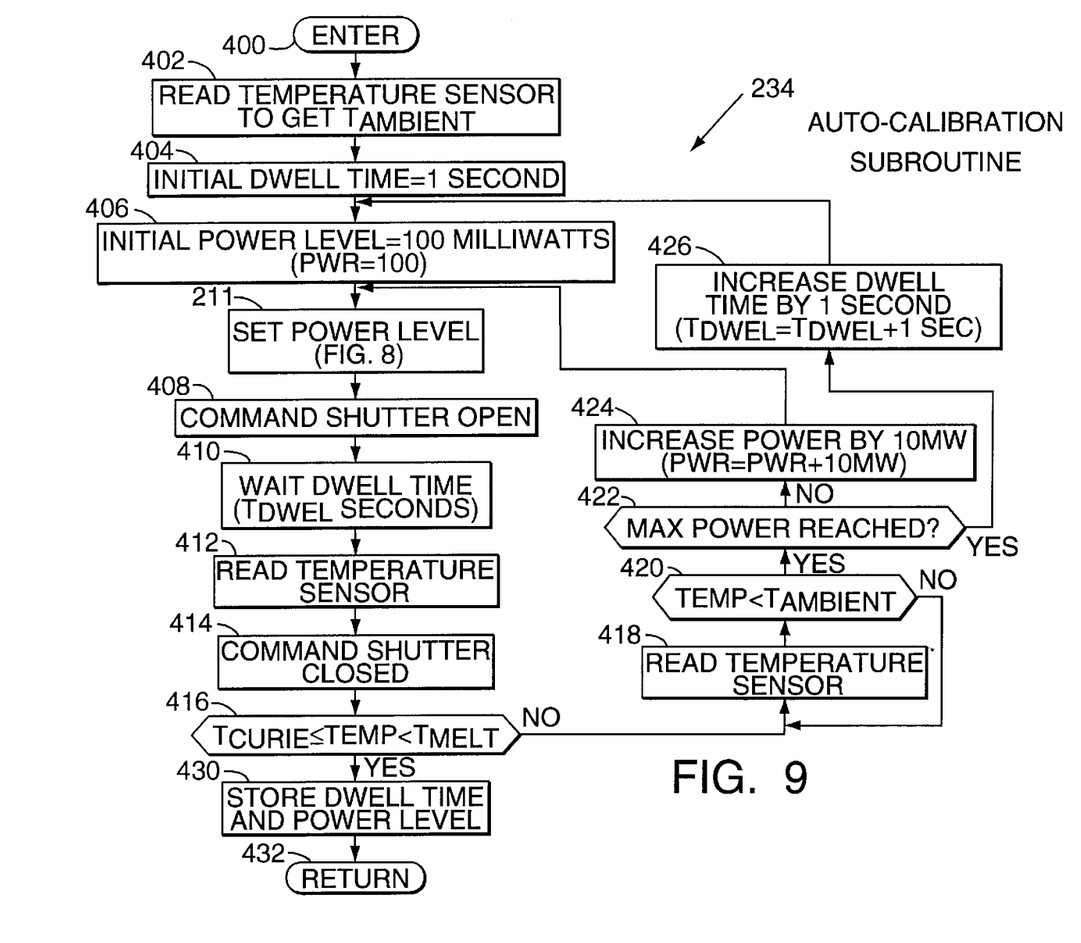
FIG. 9 is a flow chart of an auto-calibration subroutine used in FIG. 7.
Figure 10A:
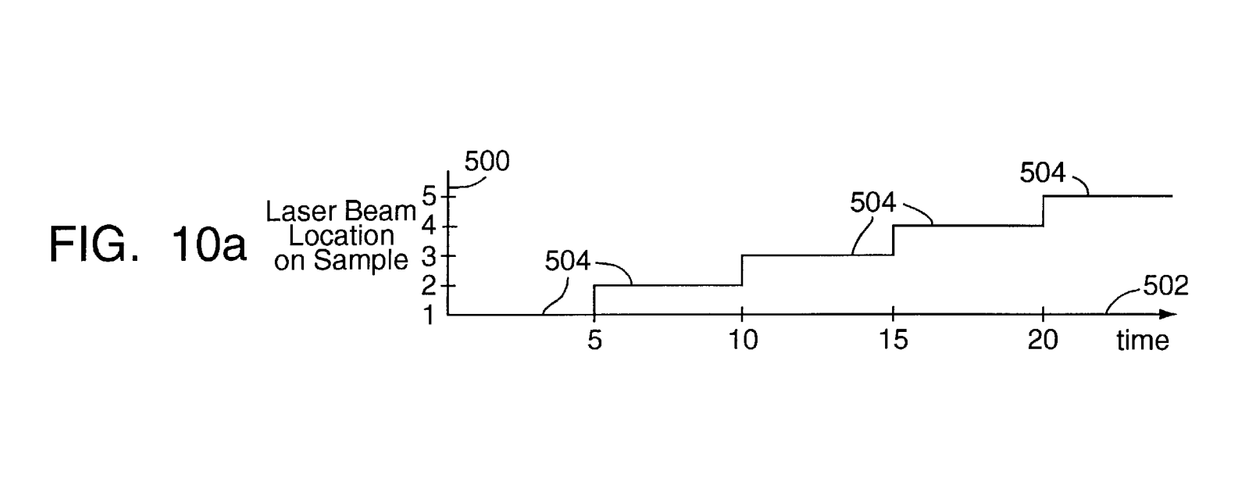
Figure 10B:
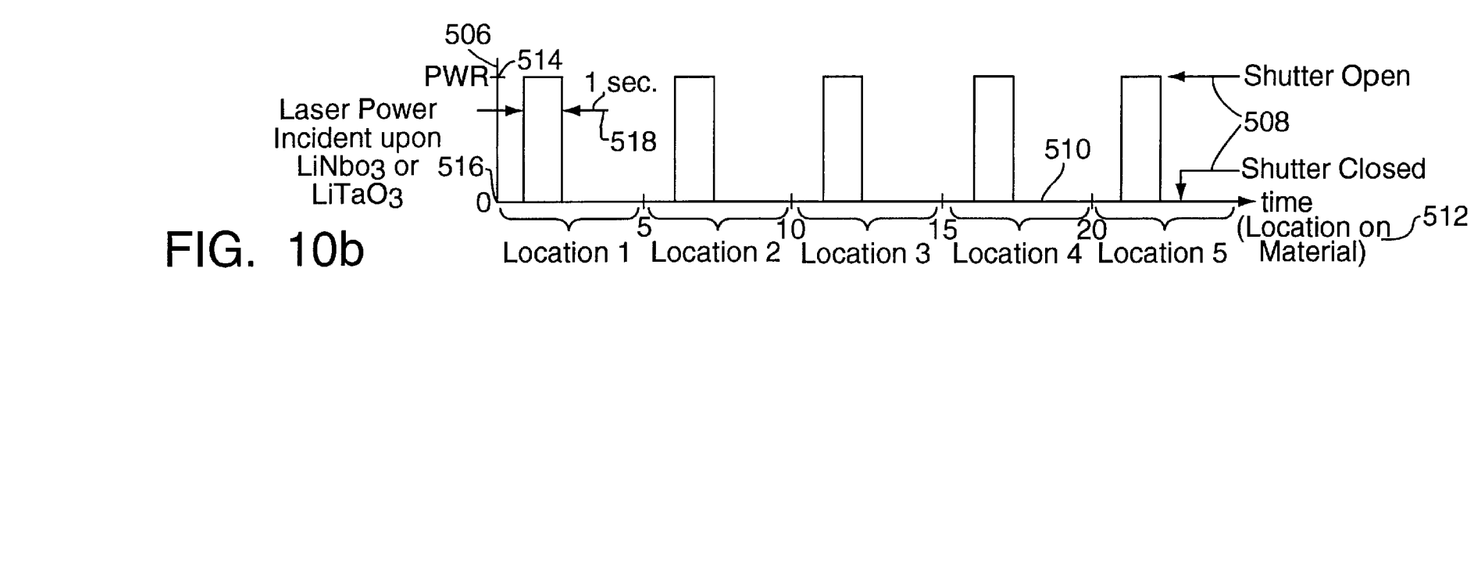
Figure 10C:
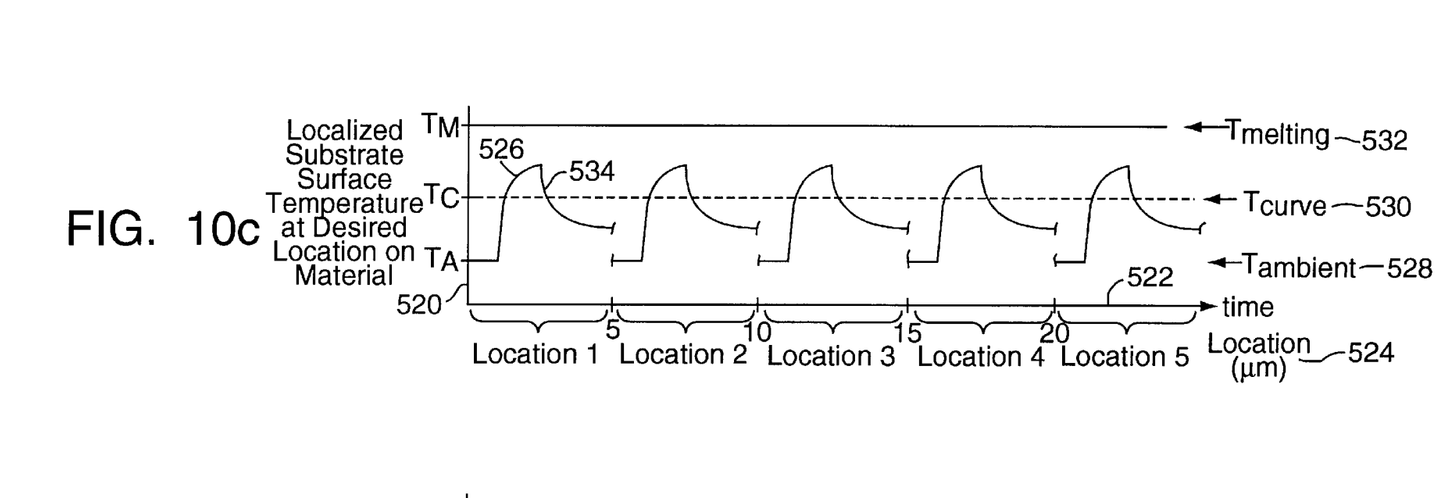
Figure 10D:
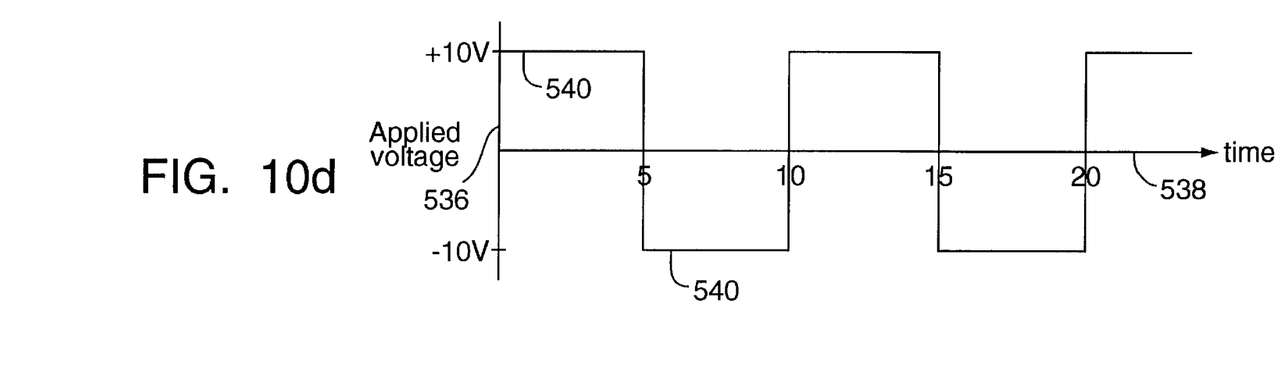

If the test 208 (FIG. 7) determines that auto-calibration is feasible, then program execution jumps to the auto-calibration subroutine 234 shown in FIG. 9 to determine an appropriate dwell time and power level for poling the material. It should be understood that auto-calibration is not a required procedure but is an alternative to manual calibration provided the poling size is large enough to allow the temperature sensor to determine the surface temperature. The subroutine 234 begins at an entry point 400, and a step 402 commands the A/D converter analog input interface to sample the analog voltage input signal from the temperature sensor 52 (FIG. 1) to determine the ambient surface temperature of the material and, thus, the starting temperature for the poling process. Then a step 404 sets an initial dwell time (TDWEL) to 1 second. Other initial starting times may be used if desired. Then a step 406 sets the initial desired power to a level known to produce a temperature below the Curie temperature for a given material, e.g., 100 milliwatts. Then a step 211 (FIG. 8) actually sets the power to the desired level by jumping to the aforementioned set power level subroutine 211 (FIG. 8). After the power is set, a step 408 commands the shutter to the open position to allow the light to be incident on the material. Then a step 410 executes a wait loop for TDWEL seconds to allow enough time for the light beam to heat the material above the Curie temperature and below the melting temperature (which is a function of the thermal time constant of the material, the ambient temperature, and the optical power applied). When the wait loop is finished (i.e., TDWEL seconds has elapsed), a step 412 reads the temperature sensor to determine the surface temperature of the material. Then a step 414 commands the shutter to the closed position and a test 416 compares the measured surface temperature against the Curie temperature and the melting temperature for the material. If the temperature is below the Curie temperature, a step 418 reads the surface temperature and a test 420 determines if the surface temperature is substantially equal to the ambient temperature read in step 402. If not, the program repeats the loop comprising the step 418 and the test 420. When the result of test 420 is affirmative, a test 422 determines if the maximum output power (i.e., minimum attenuation) has been reached. If maximum power has not been reached, the desired power level is increased by 10 milliwatts in a step 424 and the program jumps back to the step 211 to set the increased power level. Other increments for the power level increase may be used if desired. If the maximum power level has been reached, a step 426 increases the dwell time (TDWEL) by 1 second and execution jumps back to the step 406 where the desired power level is set back to the initial level (e.g., 100 milliwatts) and the loop begins again at the step 211 which calls the set power level subroutine (FIG. 8). Other increments for the dwell time increase may be used if desired. If the test 416 determines the temperature is greater than or equal to the Curie temperature and below the melting temperature, a step 430 stores the current dwell time and power level in memory and the routine exits from the point 432 where execution transfers back to the main program of FIG. 7 and the step 211. Other logic may be used to determine the requisite power level and dwell time if desired.

Although the software logic is illustrated by setting the power level prior to beginning the poling loop 215, the power setting may also be continuously monitored in the poling loop 215 to adjust for drifts in the power of the laser source 12 (FIG. 1), whereby software logic (not shown) compares the actual power to desired power and the stepper motor position is adjusted to bring the actual power within a threshold power level (e.g., 5 milliwatts) of the desired power.

The software described herein may be implemented in any high level language, e.g., BASIC or PASCAL, and is run in a non-realtime environment, i.e., the routines (tasks) are not time interrupt driven thus update rates of the routines are not specified. The maximum allowable update time for the poling loop 215 is 100 msec, which most high level languages can meet. However, the software may also be in assembly language of the host computer and/or interrupt driven if desired.

Furthermore, although detail software logic is shown for each step of the process, other logic formulations may be used to accomplish the same basic functions, i.e., apply the electric field, direct the laser (having the requisite power) to the region to be poled, wait until the surface temperature of the material is above the Curie temperature and below the melting temperature, remove the laser, and wait for the temperature to cool below the Curie temperature before removing (or changing the polarity of) the electric field.

Referring now to FIG. 10, the time and distance profile creates an alternating poling pattern which is initiated and controlled by the aforementioned software (FIG. 7). In FIG. 10(a), the laser beam position 500 plotted against time 502 shows the laser position 504 stays fixed on a given location to be poled until it is time to begin poling the next location. In FIG. 10(b), laser power 506 incident on the material (and shutter position 508) plotted against time 510 and position 512 along the material, shows a predetermined laser power level (PWR) 514 is incident on the material when the shutter is open, and no laser power 516 is incident on the material when the shutter is closed. This diagram also shows the typical length of time 518 the shutter is open. In FIG. 10(c), localized substrate surface temperature 520 plotted against time 522 and position 524 shows the surface temperature rise 526 from the ambient temperature 528 to a level above the Curie temperature 530 but below the melting temperature 532. Once the shutter closes (FIG. 10(b)) the temperature 534 of the material decays below the Curie temperature 530. This is shown for a series of successive locations 524 to be poled on the material related to laser positions 504. In FIG. 10(d), voltage applied 536 to the electrode 68 plotted against time 538 shows an alternating pattern of +10 and −10 volts 540 which alternates the polarization direction of the material at each successive location. The voltage is held constant until the surface temperature at the location being poled has decayed below the Curie temperature 530.

Instead of implementing the invention using a shutter to switch the laser light on and off the material and precisely moving the laser to each location to be poled, the invention will work equally as well placing a dielectric-reflective mask at specific locations on a material which is prepoled in either the +z-axis or −z-axis direction (e.g., the −z-axis direction 600) and scanning the laser across the material in the presence of a constant (*dc*) electric field 602 directed opposite to the pre-polarization direction, as shown in FIG. 11. The mask 604 is placed on the material where the prepoled regions are not to be reversed. As the laser scans across regions 606 without the mask 604, the temperature of these regions 606 rise above the Curie temperature and these regions will be poled in the direction of the applied dc electric field 602 (which is opposite to the preexisting polarization direction). As the laser scans across the regions with the mask 604 applied, it does not heat the material beneath the mask, thus the material polarization thereof is unaffected.

The dielectric-reflective mask is a two layer structure comprising a first layer of approximately 5,000 Å of silicon dioxide ($SiO_2$), or any dielectric material which possesses both thermal and electrical insulating properties, applied to the surface of the material, and a second layer of approximately 2000 Å of gold, or any metal that reflects most of the laser wavelength, applied to the upper surface of the $SiO_2$ layer. This coating may be applied in two steps to the material or alternatively may be prefabricated in the desired sizes and then applied to the material.

The gold reflective layer serves to reflect the laser radiation, thereby preventing the material beneath the mask from absorbing optical radiation. The $SiO_2$ dielectric layer serves as a thermal insulator to keep any radiation absorbed by the gold from heating the substrate beneath the mask. The $SiO_2$ layer also serves as an electrical insulator (dielectric) to allow the coating to be applied from one electrode, across the gap being poled, to the other electrode, thereby protecting the entire gap from being exposed to the laser light, and provides minimal electrical conductivity between the two electrodes (i.e., minimizing current leakage therebetween). The $SiO_2$ layer may be omitted if the reflective coating is placed between the two electrodes with a sufficient gap on either side to avoid conducting a current therebetween and the reflective surface reflects enough light to prevent heating the material beneath the mask.

The laser must have sufficient power and the rate of scanning the laser must be slow enough (e.g., 10 $\mu$m/sec) to allow sufficient radiation to be absorbed to heat the surface of the uncovered material above the Curie temperature but not so slow that it affects the temperature of the covered material. The precise sweep time and power level required may be determined using the aforementioned manual calibration procedure.

This implementation avoids requiring the precise placement of the beam at each successive location to be poled. It also simplifies the software logic in the computer by not having to turn the laser on and off via the shutter and not having to reverse the electric field direction (i.e., the computer 24 may apply just a dc voltage of one polarity.)

Furthermore, if the power of the laser is high enough, the laser beam may be focused on the entire sample in the presence of the electric field thereby poling the entire sample at one time. This avoids requiring the laser to be scanned across the material thereby further simplifying the software logic and avoids having to determine the proper rate of scanning.

This alternative embodiment of the invention may also be used with unpolarized material by removing the mask from the surface after poling, applying the mask over the regions just poled, reversing the *dc* electric field direction and scanning the laser across the surface a second time. This will provide poling in alternate directions from unpolarized material.

Instead of or in addition to moving the mirror as described herein, the material may be placed on a moving table, also known as a translation stage, such as a Newport Corp. Translation Stage Model No. 430-1. Also, the locations on the surface to be poled may be anywhere on the surface, i.e., not necessarily in a straight line. This may be accomplished by any two or three dimensional movement device. For example, the laser and/or the material may be moved in more than one direction. Furthermore, even though the invention is illustrated by selectively poling a plurality of regions on the material, it should be understood that the invention may be used to provide poling of only one localized region on the material. Moreover, if only one region on the material is to be poled, the laser need not be scanned nor the table moved.

Furthermore, the invention will work equally as well without the mirror-scanner, the attenuator 28, the beam splitter and optical detector 31*a* by placing the laser 12 and lens 32 at a distance from the material, and choosing a laser which provides the power required to heat the material above the Curie temperature but below the melting temperature. In that case, either the laser can be scanned along the material to be poled or the table can be moved to achieve the same result. Also, the computer 24 may be used solely to drive the voltage on the electrodes or may be replaced by a simple analog voltage source which places the desired voltage on the electrodes at the appropriate times, e.g., a simple rotary timer with contact tracks. Still further, if the laser source 12 can produce sufficient power to heat the desired region of the surface above the Curie temperature the lens may also be excluded.

Although the invention is illustrated as being implemented with two electrodes mounted to the surface of the material, the invention will work equally as well with a plurality of electrodes and a voltage applied across any two thereof. Also, if electrodes transparent to the laser wavelength are used, z-cut material may also be selectively poled by applying an electric field along the z-axis and directing the laser through the electrode. Furthermore, the electrodes are not required to be mounted to the surface but may be placed close enough to the material to generate a comparable electric field therein. Moreover, if the electrodes are not mounted to the surface, z-cut material may be poled without requiring wavelength transparent electrodes by directing the laser to the surface to be poled between the electrode and the material surface.

Furthermore, although the invention is described as being implemented using a voltage applied across electrodes to generate the electric field, any method of providing an electric field within the heated region of the material may be used.

Instead of using a laser light source, any light source having a coherence that allows the light to be focused down to the desired size of the region to be poled, having at least one wavelength capable of being absorbed by the material, and having sufficient power at that wavelength to raise the material above the Curie temperature may be used.

Furthermore, it should be understood that to avoid the possibility of thermal shock when the surface is heated above the Curie temperature by the laser, the ambient temperature of the material, prior to heating with the laser, may be heated to a temperature near to but below the Curie temperature, e.g., 1000° C. for $LiNbO_3$ and 500° C. for $LiTaO_3$, using conventional convective or conductive heating. Other heating techniques may be used if desired.

Also, although the invention has been described as using the Curie temperature as the threshold temperature for poling, it should be understood by those skilled in the art that a temperature below the Curie temperature may be used and a stronger electric field applied to achieve the same poling effect. If the ambient temperature and the threshold temperature are both near the Curie temperature and the electric field is applied to a larger region than the region to be poled (as shown in FIG. 4), the ambient temperature must be below the threshold temperature and the electric field strength must be strong enough to orient the polarization of the material at the threshold temperature but not so strong as to orient the polarization of the material at the ambient temperature.

Furthermore, although the invention is described as poling the material with the z-axis parallel to the plane of surface to be poled (the surface that the laser is incident upon), it should be understood by those skilled in the art that the invention will work equally as well with the z-axis pointing in any direction except normal to the surface being poled (i.e., any non z-cut material) by applying a stronger electric field.

Still further, the variable attenuator may be manually adjusted to achieve the desired power level by monitoring the output driver's meter display instead of having the computer read the optical signal and drive the attenuator.

Even though the selectively poled non z-cut material has been described as being used for optical frequency doubling, it should be understood by those skilled in the art that selective poling of non z-cut material allows the design of new devices (and the improvement of existing devices) never before possible and the invention provides the method for poling the material for such devices.

Although the invention has been described and illustrated with respect to exemplary embodiments thereof, it should be understood by those skilled in the art that the foregoing and various other changes, omissions and additions may be made without departing from the spirit and the scope of the invention.

We claim:

1. A method of altering the electrooptic characteristics of a lithium niobate optical frequency doubling integrated optic chip by poling, comprising the poling steps of:

heating a localized region of the surface of said lithium niobate frequency doubling integrated optic chip to a threshold temperature above the Curie temperature of said integrated optic chip and below the melting temperature of the lithium niobate material using a light beam, said localized region having an area substantially smaller than the area of said surface;

applying an electric field in the region of said lithium niobate frequency doubling integrated optic chip where said heating occurs, said electric field having a component that lies along the desired direction of the polarization and being sufficiently strong to orient the polarization direction of the localized region of said lithium niobate chip at said threshold temperature; and allowing said heated, localized region to cool while said electric field is being applied until the temperature is below said threshold temperature, thereby fixing the polarization direction of the previously-heated, localized region of said integrated optic chip.

2. The method of claim 1 wherein said step of heating further comprises the step of heating at a plurality of locations.

3. The method of claim 1 wherein said step of heating further comprises the step of placing a mask on said surface of said lithium niobate frequency doubling integrated optic chip to confine the region of localized heating to unmasked surface regions.

4. The method of claim 1 wherein said step of applying said electric field comprises the steps of:

providing at least two electrically conductive electrodes; and applying a voltage across said electrodes, such that an electric field is created within said lithium niobate frequency doubling integrated optic chip, said electric field having a polarity which defines the polarization of the heated region of said integrated optic chip.

5. The method of claim 1 wherein said step of heating comprises the step of heating said surface of said lithium niobate frequency doubling integrated optic chip with a laser.

6. A method of poling a lithium niobate integrated optic chip, comprising the poling steps of:

heating a localized region of the surface of said lithium niobate integrated optic chip to a threshold temperature above the Curie temperature of said integrated optic chip and below the melting temperature of the lithium niobate material using a light beam, said localized region having an area substantially smaller than the area of said surface; and applying an electric field in the localized region of said lithium integrated optic chip where said heating occurs, said electric field having a component that lies along the desired direction of the polarization and being sufficiently strong to orient the polarization direction of said lithium niobate chip at said threshold temperature, said electric field being applied until the temperature is below said threshold temperature, thereby fixing the polarization direction of said integrated optic chip within the previously-heated, localized region.

7. A method of altering the electrooptic characteristics of a lithium tantalate frequency doubling integrated optic chip by poling, comprising the poling steps of:

heating a localized region of the surface of said lithium tantalate frequency doubling integrated optic chip to a threshold temperature above the Curie temperature of said integrated optic chip and below the melting temperature of the lithium tantalate material using a light beam, said localized region having an area substantially smaller than the area of said surface;

applying an electric field in the region of said lithium tantalate frequency doubling integrated optic chip where said heating occurs, said electric field having a component that lies along the desired direction of the polarization and being sufficiently strong to orient the polarization direction of the localized region of said lithium tantalate chip at said threshold temperature; and allowing said heated, localized region to cool while said electric field is being applied until the temperature is below said threshold temperature, thereby fixing the polarization direction within the previously-heated, localized region of said integrated optic chip.

8. The method of claim 7 wherein said step of heating further comprises the step of heating a localized region of said surface of said lithium tantalate frequency doubling integrated optic chip, said localized region being significantly smaller in size than said surface of said integrated optic chip.

9. The method of claim 7 wherein said step of heating further comprises the step of heating a plurality of locations.

10. The method of claim 7 wherein said step of heating further comprises the step of placing a mask on said surface of said lithium tantalate frequency doubling integrated optic chip to confine the region of localized heating to unmasked surface regions.

11. The method of claim 9 wherein said step of applying said electric field further comprises the steps of:

provi­ding at least two electrically conductive electrodes; and applying a voltage across said electrodes, such that an electric field is created within said lithium tantalate frequency doubling integrated optic chip, said electric field having a polarity which defines the polarization of the heated region of said integrated optic chip.

12. The method of claim 9 wherein said step of heating comprises the step of heating said surface of said lithium tantalate frequency doubling integrated optic chip with a laser.

* * * * *